(12) United States Patent
Doshi

(10) Patent No.: US 10,163,030 B2
(45) Date of Patent: *Dec. 25, 2018

(54) ON-CAMERA IMAGE PROCESSING BASED ON IMAGE ACTIVITY DATA

(71) Applicant: GoPro, Inc., San Mateo, CA (US)

(72) Inventor: Sandeep Doshi, Sunnyvale, CA (US)

(73) Assignee: GoPro, Inc., San Mateo, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/593,630

(22) Filed: May 12, 2017

(65) Prior Publication Data

US 2017/0339390 A1 Nov. 23, 2017

Related U.S. Application Data

(60) Provisional application No. 62/339,402, filed on May 20, 2016, provisional application No. 62/339,405, filed on May 20, 2016.

(51) Int. Cl.
*G06K 9/46* (2006.01)
*H04N 9/04* (2006.01)
(Continued)

(52) U.S. Cl.
CPC ............. *G06K 9/4647* (2013.01); *G06K 9/38* (2013.01); *G06K 9/4652* (2013.01); *G06T 1/20* (2013.01);
(Continued)

(58) Field of Classification Search
CPC ...... G06K 9/4647; G06K 9/38; G06K 9/4652; G06T 1/20; G06T 7/90; G06T 7/40;
(Continued)

(56) References Cited

U.S. PATENT DOCUMENTS 5,649,032 A 7/1997 Burt et al.
6,389,179 B1 5/2002 Katayama et al.
(Continued)

FOREIGN PATENT DOCUMENTS

CN 104735464 A 6/2015
EP 1162830 A2 12/2001
WO WO-2013130071 A1 9/2013

OTHER PUBLICATIONS

Achanta R., et al., "Slic Superpixels Compared to State-of-the-Art Superpixel Methods," IEEE Transactions on Pattern Analysis and Machine Intelligence, 2012, vol. 34 (11), pp. 2274-2282.
(Continued)

*Primary Examiner* — Pritham Prabhakher
(74) *Attorney, Agent, or Firm* — Gazdzinski & Assciates, PC

(57) ABSTRACT

A camera system processes images based on image activity data. The camera system includes an image sensor, an image pipeline, an encoder and a memory. The image sensor converts light incident upon the image sensor into raw image data. The image pipeline converts raw image data into color-space image data and calculates activity variances of the color-space image data. The encoder can determine one or more of quantization levels, block type (Intra vs Inter), determining transform size and type, and determining GOP structure or reference frame spacing for the color-space image data based on the activity variances. The memory stores the color-space image data and the activity variances.

20 Claims, 11 Drawing Sheets

(51) Int. Cl.
| | |
|---|---|
| H04N 19/124 | (2014.01) |
| G06T 1/20 | (2006.01) |
| H04N 19/186 | (2014.01) |
| H04N 19/85 | (2014.01) |
| G06T 7/90 | (2017.01) |
| G06K 9/38 | (2006.01) |
| G06T 7/40 | (2017.01) |
| H04N 5/232 | (2006.01) |
| H04N 5/77 | (2006.01) |
| H04N 9/804 | (2006.01) |

(52) U.S. Cl.
CPC ............ *G06T 7/40* (2013.01); *G06T 7/90* (2017.01); *H04N 5/23232* (2013.01); *H04N 5/77* (2013.01); *H04N 9/045* (2013.01); *H04N 9/8042* (2013.01); *H04N 19/124* (2014.11); *H04N 19/186* (2014.11); *H04N 19/85* (2014.11)

(58) Field of Classification Search
CPC .... H04N 19/124; H04N 19/186; H04N 19/85; H04N 5/23232; H04N 5/77; H04N 9/045; H04N 9/8042
USPC ...................................................... 348/222.1
See application file for complete search history.

(56) References Cited

U.S. PATENT DOCUMENTS

| | | | |
|---|---|---|---|
| 8,606,073 | B2 | 12/2013 | Woodman |
| 9,171,577 | B1 | 10/2015 | Newman et al. |
| 9,277,122 | B1 | 3/2016 | Imura et al. |
| 9,286,839 | B2* | 3/2016 | Okuda ................ G09G 3/3611 |
| 9,355,433 | B1 | 5/2016 | Adsumilli et al. |
| 9,369,689 | B1 | 6/2016 | Tran et al. |
| 9,478,054 | B1 | 10/2016 | Lewis et al. |
| 9,575,803 | B2 | 2/2017 | Chauvet et al. |
| 9,681,111 | B1 | 6/2017 | Newman |
| 9,681,140 | B2* | 6/2017 | Le Leannec ......... H04N 19/186 |
| 9,774,855 | B2* | 9/2017 | Gao ..................... H04N 19/124 |
| 2001/0047517 | A1 | 11/2001 | Christopoulos et al. |
| 2003/0007567 | A1 | 1/2003 | Newman et al. |
| 2003/0035047 | A1 | 2/2003 | Katayama et al. |
| 2003/0234866 | A1 | 12/2003 | Cutler |
| 2005/0226483 | A1 | 10/2005 | Geiger et al. |
| 2006/0159352 | A1 | 7/2006 | Ishtiaq et al. |
| 2006/0188014 | A1 | 8/2006 | Civanlar et al. |
| 2006/0256397 | A1 | 11/2006 | Cui |
| 2006/0268131 | A1 | 11/2006 | Cutler |
| 2007/0025723 | A1 | 2/2007 | Baudisch et al. |
| 2007/0064800 | A1 | 3/2007 | Ha |
| 2007/0237420 | A1 | 10/2007 | Steedly et al. |
| 2008/0131014 | A1* | 6/2008 | Lee ..................... H04N 19/154 382/251 |
| 2008/0165105 | A1* | 7/2008 | Okuda ................ G09G 3/3611 345/89 |
| 2008/0187043 | A1* | 8/2008 | Ahn ..................... H04N 19/139 375/240.03 |
| 2008/0304567 | A1 | 12/2008 | Boyce et al. |
| 2009/0180552 | A1 | 7/2009 | Visharam et al. |
| 2010/0014780 | A1 | 1/2010 | Kalayeh |
| 2010/0054628 | A1 | 3/2010 | Levy et al. |
| 2010/0158134 | A1 | 6/2010 | Yin et al. |
| 2010/0246691 | A1* | 9/2010 | Filippini .......... H04N 19/00084 375/240.29 |
| 2011/0135198 | A1* | 6/2011 | Schuler ..................... G06T 9/00 382/166 |
| 2012/0092453 | A1 | 4/2012 | Suh |
| 2012/0242788 | A1 | 9/2012 | Chuang et al. |
| 2012/0307000 | A1 | 12/2012 | Doepke et al. |
| 2014/0036998 | A1* | 2/2014 | Narroschke .......... H04N 19/176 375/240.03 |
| 2014/0105278 | A1* | 4/2014 | Bivolarsky ............ H04N 19/46 375/240.03 |
| 2014/0152863 | A1 | 6/2014 | Drouot |
| 2014/0218354 | A1 | 8/2014 | Park, II et al. |
| 2014/0258552 | A1 | 9/2014 | Oyman et al. |
| 2015/0043655 | A1* | 2/2015 | Nilsson .................. H04N 9/646 375/240.26 |
| 2015/0049956 | A1* | 2/2015 | Kato ..................... H04N 19/50 382/233 |
| 2015/0063449 | A1* | 3/2015 | Pearson ............... H04N 19/176 375/240.05 |
| 2015/0065803 | A1 | 3/2015 | Douglas et al. |
| 2015/0109468 | A1 | 4/2015 | Laroia et al. |
| 2015/0124877 | A1 | 5/2015 | Choi et al. |
| 2015/0138311 | A1 | 5/2015 | Towndrow |
| 2015/0249813 | A1 | 9/2015 | Cole et al. |
| 2015/0296231 | A1 | 10/2015 | Kwon et al. |
| 2015/0341552 | A1 | 11/2015 | Chen et al. |
| 2015/0341557 | A1 | 11/2015 | Chapdelaine-Couture et al. |
| 2015/0346832 | A1 | 12/2015 | Cole et al. |
| 2015/0365688 | A1* | 12/2015 | Su ......................... H04N 19/11 375/240.03 |
| 2016/0012855 | A1 | 1/2016 | Krishnan |
| 2016/0014422 | A1 | 1/2016 | Su et al. |
| 2016/0050423 | A1 | 2/2016 | Alshina et al. |
| 2016/0065947 | A1 | 3/2016 | Cole et al. |
| 2016/0073111 | A1* | 3/2016 | Lee ..................... H04N 19/124 375/240.03 |
| 2016/0142697 | A1 | 5/2016 | Budagavi et al. |
| 2016/0173884 | A1* | 6/2016 | Le Leannec ......... H04N 19/186 382/166 |
| 2016/0241892 | A1 | 8/2016 | Cole et al. |
| 2016/0253795 | A1 | 9/2016 | Cole et al. |
| 2016/0274338 | A1 | 9/2016 | Davies et al. |
| 2016/0295128 | A1 | 10/2016 | Schnittman et al. |
| 2016/0323556 | A1* | 11/2016 | Luginbuhl ............... H04N 9/67 |
| 2016/0366422 | A1* | 12/2016 | Yin ..................... H04N 19/117 |
| 2017/0178594 | A1* | 6/2017 | Hasselgren .......... H04N 19/124 |

OTHER PUBLICATIONS

Allène C., et al., "Seamless Image-based Texture Atlases Using Multi-band Blending," Pattern Recognition, 2008. ICPR 2008. 19th International Conference on, 2008.

Badrinarayanan V., et al., "Segnet: a Deep Convolutional Encoder-Decoder Architecture for Image Segmentation," arXiv preprint arXiv:1511.00561, 2015.

Barghout L. and Sheynin J., "Real-world scene perception and perceptual organization: Lessons from Computer Vision". Journal of Vision, 2013, vol. 13 (9). (Abstract).

Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.

Bay H., et al., "Surf: Speeded up Robust Features," European Conference on Computer Vision, Springer Berlin Heidelberg, 2006, pp. 404-417.

Beier et al., "Feature-Based Image Metamorphosis," in Computer Graphics Journal, Jul. 1992, vol. 26 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., "A Multiresolution Spline with Application to Image Mosaics," in ACM Transactions on Graphics (TOG), 1983, vol. 2, No. 4, pp. 217-236.

Chan et al., "Active contours without edges". IEEE Transactions on Image Processing, 2001, 10 (2), pp. 266-277 (hereinafter "Chan").

Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.

Elen, "Whatever happened to Ambisonics" AudioMedia Magazine, Nov. 1991.

Gracias, et al., "Fast Image Blending Using Watersheds and Graph Cuts," Image and Vision Computing, 2009, vol. 27 (5), pp. 597-607.

(56) References Cited

OTHER PUBLICATIONS

Grois D., et al., "Complexity-Aware Adaptive Spatial Pre-Processing for ROI Scalable Video Coding With Dynamic Transition Region", Image Processing (ICIP), 2011 18th IEEE International Conference on, IEEE, Sep. 11, 2011, pp. 741-744, XP032080597, DOI: 10.1109/ICIP.2011.6116661, ISBN: 978-1-4577-1304-0.
Grois, et al., "Efficient Adaptive Bit-Rate Control for ROI Scalable Video Coding", Workshop on Picture Coding and Image Processing 2010; Jul. 12, 2010-Jul. 12, 2010; Nagoya, Dec. 7, 2010 (Dec. 7, 2017), XP030082089.
Grois, et al., "Recent Advances in Region-of-Interest Video Coding" In: "Recent Advances on Video Coding", Jul. 5, 2011 (Jul. 5, 2011), InTech, XP055257835, ISBN: 978-953-30-7181-7 DOI: 10.5772/17789.
H.264 (Jan. 2012) and/or ISO/IEC 14496 ∟ 10:2012, Information technology ∟ Coding of audio ∟ visual objects ∟ Part 10: Advanced Video Coding.
H.265 (Dec. 2016) also known as High Efficiency Video Code (HVEC),(described in e.g., ITU∟ T Study Group 16—Video Coding Experts Group (VCEG)—ITU∟ T H.265, and/or ISO/IEC JTC 1/SC 29/WG 11 Motion Picture Experts Group (MPEG)—the HEVC standard ISO/IEC 23008∟ 2:2015.
Herbst E., et al., "Occlusion Reasoning for Temporal Interpolation Using Optical Flow," Department of Computer Science and Engineering, University of Washington, Tech. Rep. UW-CSE-09-08-01, 2009.
Ichimura D., et al., "Slice Group Map for Mult. Interactive ROI Seal", 17. JVT Meeting; 74.MPEG Meeting; Oct. 14, 2005-Oct. 21, 2005; Nice, FR;(Joint Video Team of ISO/IEC JTC1/SC29/WG11 and ITU-T SG.16 ), No. JVT-Q020r1, Oct. 14, 2005 (Oct. 14, 2005), XP030006183, ISSN: 0000-0413.
Jakubowski M., et al., "Block-based motion estimation algorithms—a survey," Opto-Electronics Review 21, No. 1 (2013), pp. 86-102.
Kendall A., et al., "Bayesian Segnet: Model Uncertainty in Deep Convolutional Encoder-Decoder Architectures for Scene Understanding," arXiv:1511.02680, 2015.
Lowe D.G., "Object Recognition From Local Scale-invariant Features," Computer vision, The proceedings of the seventh IEEE international conference on 1999, vol. 2, pp. 1150-1157.
Mitzel D., et al., "Video Super Resolution Using Duality Based TV-l 1 Optical Flow," Joint Pattern Recognition Symposium, 2009, pp. 432-441.
Pérez et al., "Poisson Image Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Suzuki et al., "Inter Frame Coding with Template Matching Averaging," in IEEE International Conference on Image Processing Proceedings (2007), vol. (III), pp. 409-412.
Szeliski R., "Computer Vision: Algorithms and Applications," Springer Science & Business Media, 2010.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Ugur. et al.,"MV-HEVC/SHVC HLS: On default Output Layer Sets", Jan. 2014.
Vass, J., et al., "Efficient Three-Dimensional Wavelet Codecs for Networked Video Communication," in Proceedings of IEEE International Conference on Image Processing, Kobe, Japan, Oct. 1999, pp. 565-569.
Won, et al., "Size-Controllable Region-of-Interest in Scalable Image Representation", IEEE Transactions on Image Processing, IEEE Service Center, Piscataway, NJ, US, vol. 20, No. 5, May 1, 2011 (May 1, 2011), pp. 1273-1280, XPO 11411787, ISSN: 1057-7149, DOI: 10.1109/TIP.2010.2090534.
Xiao, et al., "Multiple View Semantic Segmentation for Street View Images," 2009 IEEE 12th International Conference on Computer Vision, 2009, pp. 686-693.
Xiong Y., et al., "Gradient Domain Image Blending and Implementation on Mobile Devices," International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

\* cited by examiner

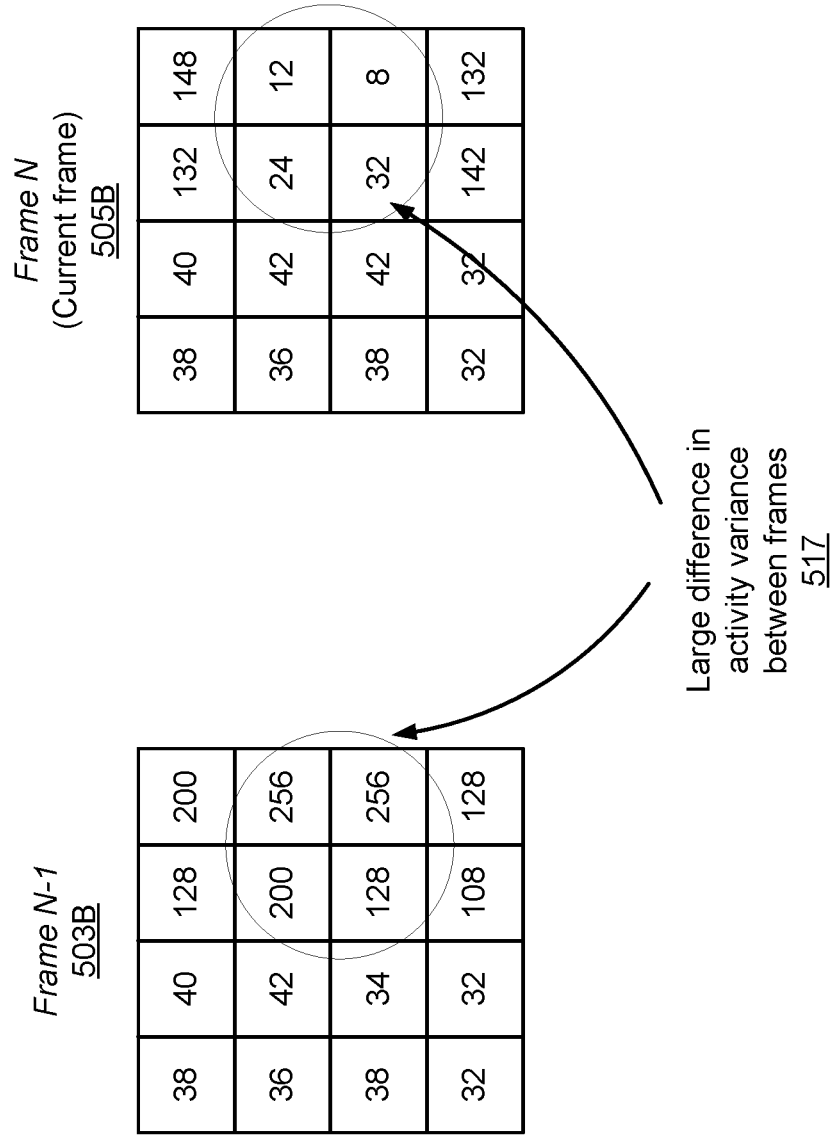

700

Convert Light Incident upon an Image Sensor into Raw Image Data.
710

↓

Convert Raw Image Data into Color-space Image Data
720

↓

Calculate Luminance Levels of the Color-space Image Data
730

↓

Store the Color-space Image Data and the Luminance Levels into a Memory
740

↓

Extract the Color-space Image Data and the Luminance Levels from the Memory
750

↓

Encode the Color-space Image Data based on the Luminance Levels
760

FIG. 7

ON-CAMERA IMAGE PROCESSING BASED ON IMAGE ACTIVITY DATA

CROSS REFERENCE TO RELATED APPLICATIONS

This application claims the benefit of U.S. Provisional Application No. 62/339,402 of the same title, filed May 20, 2016, and U.S. Provisional Application No. 62/339,405 entitled "ON-CAMERA IMAGE PROCESSING BASED ON IMAGE LUMINANCE DATA", filed May 20, 2016, each of which is incorporated by reference in its entirety.

The present application is related to commonly owned U.S. patent application Ser. No. 15/593,629, entitled "ON-CAMERA IMAGE PROCESSING BASED ON IMAGE LUMINANCE DATA" and filed May 12, 2017.

Field of Art

The disclosure generally relates to the field of digital image and video processing, and more particularly to image luminance data and image activity data within a camera architecture.

Description of the Related Art

As encoding technology improves, in-camera encoders are better able to encode images and videos in real time. However, real-time encoders often suffer from lossy content encoding issues, such as losing image quality and data associated with luminance and/or activity variance. In digital camera systems, such encoder issues can hinder camera capabilities. Furthermore, even if an encoder has the capability to encode images and videos without losing too much detail, the encoder may use larger bandwidth with larger latency and higher power than a typical camera can provide.

Summary

In one aspect of the present disclosure, a camera system is disclosed. In one embodiment, the camera system includes: an image sensor configured to convert light incident upon the image sensor into raw image data; an image pipeline configured to: convert the raw image data into color-space image data; and calculate activity variances of the color-space image data; an encoder configured to: determine quantization levels of the color-space image data based on the activity variances; and encode the color-space image data using the determined quantization levels to produce encoded image data; and a memory configured to store the encoded image data.

In another aspect of the present disclosure, a method is disclosed. In one embodiment, the method includes: capturing, by a camera, light incident upon an image sensor to produce raw image data; converting, by the camera, the raw image data into color-space image data; calculating, by the camera, activity variances of the color-space image data; determining, by the camera, quantization levels of the color-space image data based on the activity variances; and encoding the color-space image data using the determined quantization levels to produce encoded image data.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5B illustrates a diagram of determining a block type based on image activity data, in according to one embodiment.

FIG. 7 illustrates a process for encoding image data based on image luminance data, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera Configuration

Figure 1:
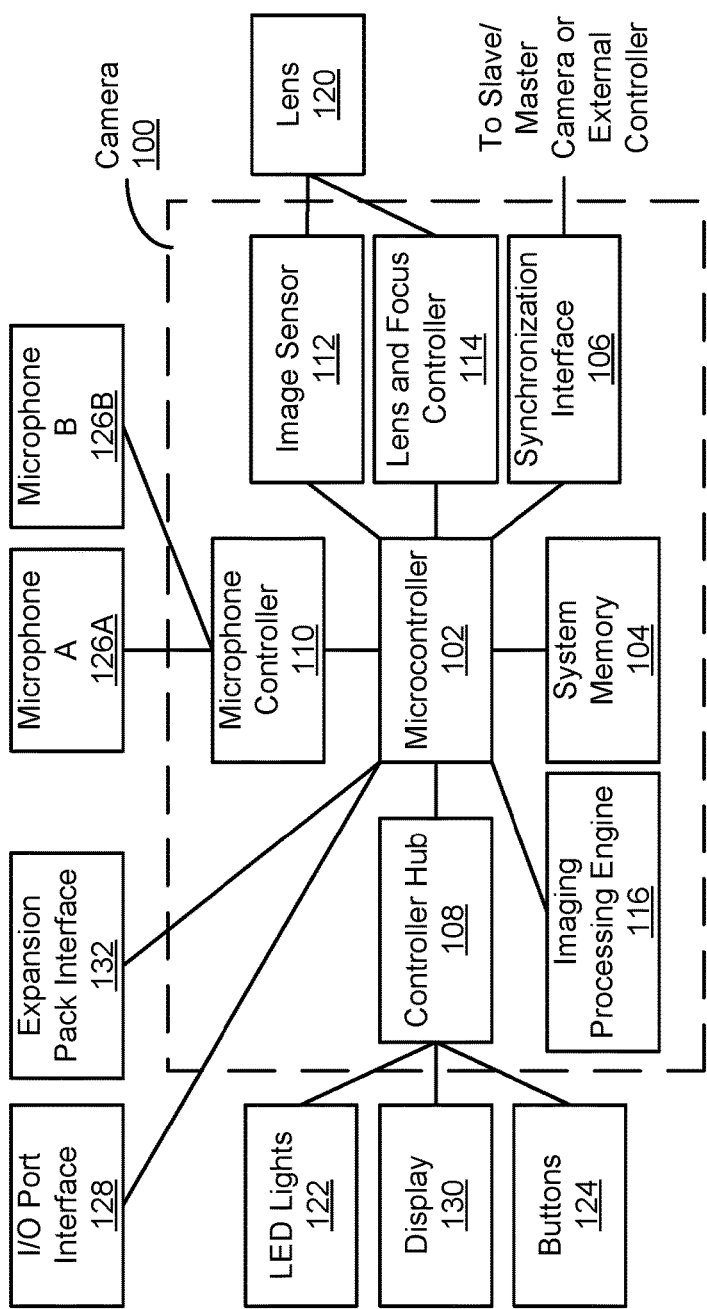
FIG. 1 illustrates an example high-level block diagram of a camera system for processing images based on image luminance data and/or image activity data within a digital image, according to one embodiment.

FIG. 1 illustrates an example high-level block diagram of a camera system for processing images based on image luminance data and/or image activity data within a digital image, according to one embodiment. The camera 100 of the embodiment of FIG. 1 includes one or more microcontrollers 102, a system memory 104, a synchronization interface 106, a controller hub 108, one or more microphone controllers 110, one or more image sensors 112, a lens and focus controller 114, an image processing engine 116, one or more lenses 120, one or more LED lights 122, one or more buttons 124, one or more microphones 126, an I/O port interface 128, a display 130, and an expansion pack interface 132.

The camera 100 includes one or more microcontrollers 102 (such as a processor) that control the operation and functionality of the camera 100. For instance, the microcontrollers 102 can execute computer instructions stored on the memory 104 to perform the functionality described herein. In some embodiments, the camera 100 can capture image data, can provide the image data to an external system (such as a computer, a mobile phone, or another camera), and the external system can generate a color map and a tone map based on the captured image data.

A lens and focus controller 114 is configured to control the operation, configuration, and focus of the camera lens 120, for instance based on user input or based on analysis of captured image data. The image sensor 112 is a device capable of electronically capturing light incident on the image sensor 112 and converting the captured light to image data. The image sensor 112 can be a CMOS sensor, a CCD sensor, or any other suitable type of image sensor, and can include corresponding transistors, photodiodes, amplifiers, analog-to-digital converters, and power supplies.

A system memory 104 is configured to store executable computer instructions that, when executed by the microcontroller 102, perform the camera functionalities described herein. The system memory 104 also stores images captured using the lens 120 and image sensor 112. The memory 104 can include volatile memory (e.g., random access memory (RAM)), non-volatile memory (e.g., a flash memory), or a combination thereof. In some embodiments, the memory 104 may be a double data rate synchronous dynamic random-access memory (DDR), an on-chip buffer, or an off-chip buffer. The memory stores data processed by the image processing engine 116.

A synchronization interface 106 is configured to communicatively couple the camera 100 with external devices, such as a remote control, another camera (such as a slave camera or master camera), a computer, or a smartphone. The synchronization interface 106 may transfer information through a network, which allows coupled devices, including the camera 100, to exchange data other over local-area or wide-area networks. The network may contain a combination of wired or wireless technology and make use of various connection standards and protocols, such as WiFi, IEEE 1394, Ethernet, 802.11, 4G, or Bluetooth.

A controller hub 108 transmits and receives information from user I/O components. In one embodiment, the controller hub 108 interfaces with the LED lights 122, the display 130, and the buttons 124. However, the controller hub 108 can interface with any conventional user I/O component or components. For example, the controller hub 108 may send information to other user I/O components, such as a speaker.

A microphone controller 110 receives and captures audio signals from one or more microphones, such as microphone 126A and microphone 126B. Although the embodiment of FIG. 1 illustrates two microphones, in practice, the camera can include any number of microphones. The microphone controller 110 is configured to control the operation of the microphones 126. In some embodiments, the microphone controller 110 selects which microphones from which audio data is captured. For instance, for a camera 100 with multiple microphone pairs, the microphone controller 110 selects one microphone of the pair to capture audio data.

The image processing engine 116 uses an image pipeline to calculate image luminance data (also referred to as luminance levels) and/or image activity data (also referred to as activity variances) for the image data captured by the image sensor 112, and to convert the captured image data into a color-space image data. Examples of a color space may include a RGB-type color space (e.g., sRGB, Adobe RGB, Adobe Wide Gamut RGB, etc.), a CIE defined standard color space (e.g., CIE 1931 XYZ, CIELUV, CIELAB, CIEUVW, etc.), a Luma plus chroma/chrominance-based color space (e.g., YIQ, YUV, YDbDr, YPbPr, YCbCr, xvYCC, LAB, etc.), a hue and saturation-based color space (e.g., HSV, HSL), or a CMYK-type color space. For example, the image processing engine 116 can convert RAW RGB image data into YUV image data. In some embodiments, the image processing engine 116 identifies a plurality of blocks of the captured image data and calculates luminance level and/or activity variance for each block (for instance, by determining an average luminance or activity for all pixels of the captured image data or portions of each block of the captured image data (or, likewise, scaled up or scaled down pixels of the captured image data). The image processing engine 116 stores the converted color-space (e.g., YUV data) image data and corresponding luminance levels and/or activity variances into the memory 104.

The image processing engine 116 includes an encoder to generate compressed encoded data using the converted color-space image data and corresponding luminance levels and/or activity variances extracted from the memory 104. Examples of an encoder may include an H.264 encoder, an H.265/HEVC encoder, a VP9 encoder or a JPEG encoder. In some embodiments, the image processing engine 116 selects a quantization level, a block type such as Intra or Inter block, and/or a transform size and/or type for each block of the converted color-space image data based on a corresponding luminance level and/or activity variance. In some embodiments, the image processing engine 116 selects a frame type (such as Intra or Inter frame), or selects group of pictures (GOP) structure for encoding based on a corresponding luminance level and/or activity variance. Examples of the image processing engine 116 are further described in detail below with regard to FIGS. 3-5.

In some embodiments, the image processing engine 116 may include a pre-encoding module to further process image data before encoding within the image pipeline of the camera 100. For example, the image pipeline can output converted color-space image data and corresponding luminance levels and/or activity variances. The image processing engine 116 may pre-process this output using one or more pre-processing operations, such as operations reversing effects of geometric distortions caused by the lens 120 (e.g., Dewarping), operations reducing noise (e.g., 3D noise reduction), and operations reducing blurring associated with motions of the camera 100 during exposure (e.g., electronic image stabilization). It should be noted that in some embodiments, such pre-processing operations are performed on the image data before encoding, for instance before the encoded image data is stored by the camera 100.

Additional components connected to the microcontroller 102 include an I/O port interface 128 and an expansion pack interface 132. The I/O port interface 128 may facilitate the camera 100 in receiving or transmitting video or audio information through an I/O port. Examples of I/O ports or interfaces include USB ports, HDMI ports, Ethernet ports, audioports, and the like. Furthermore, embodiments of the I/O port interface 128 may include wireless ports that can accommodate wireless connections. Examples of wireless ports include Bluetooth, Wireless USB, Near Field Communication (NFC), and the like. The expansion pack interface 132 is configured to interface with camera add-ons and removable expansion packs, such as an extra battery module, a wireless module, and the like.

Image Processing Based on Image Luminance Data and/or Image Activity Data

Figure 2:
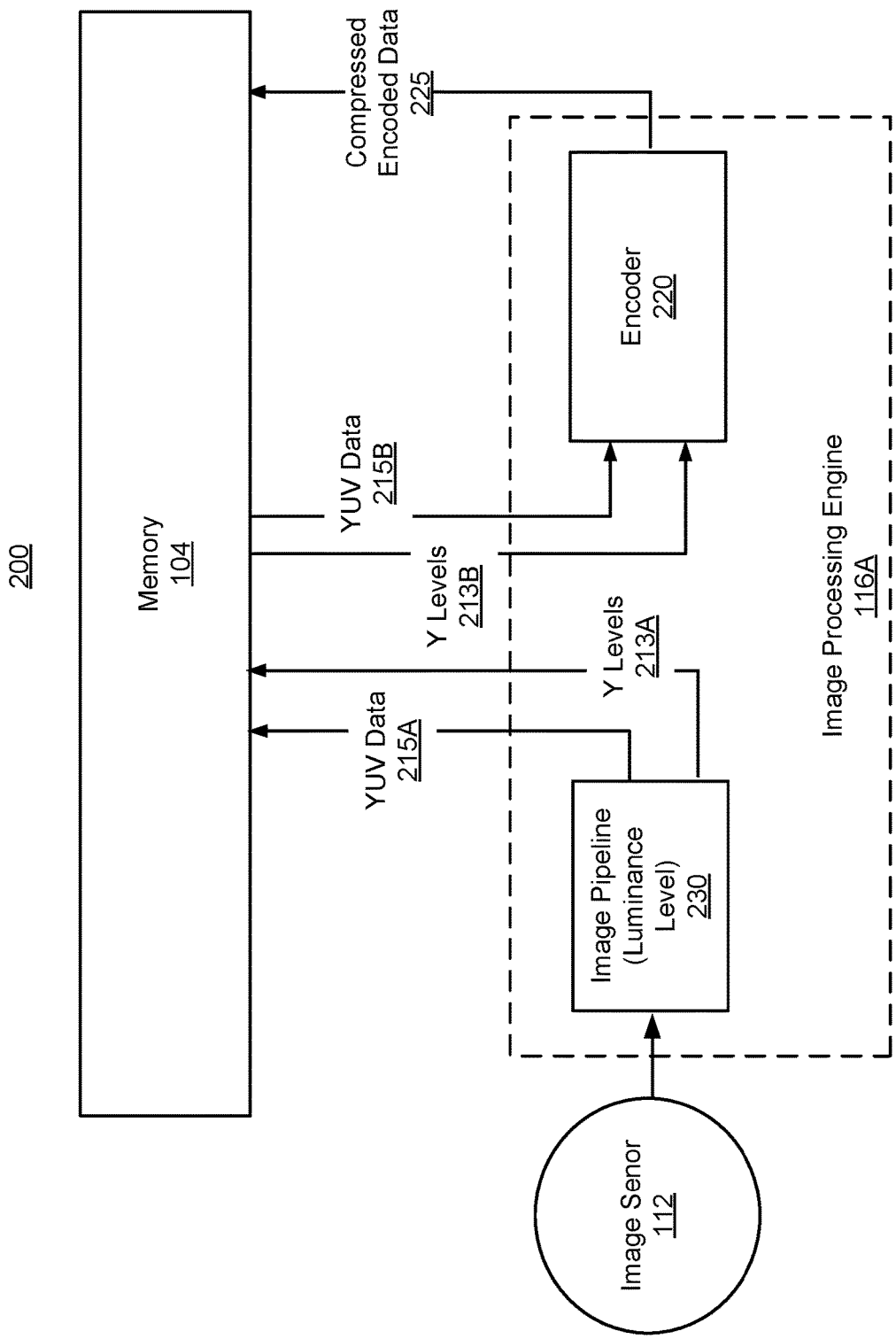
FIG. 2 illustrates an example high-level block diagram of a camera system for processing images based on image luminance data, according to one embodiment.

FIG. 2 illustrates an example high-level block diagram of a camera system for processing images based on image luminance data, according to one embodiment. In the embodiment of FIG. 2, the imaging processing engine 116A includes a luminance-based image pipeline 230 and an encoder 220. In some embodiments, the imaging processing engine 116A may include different and/or additional components than those illustrated in the embodiment of FIG. 2 to perform the functionalities described herein.

As shown in FIG. 2, the luminance-based image pipeline 230 receives the captured image data from the image sensor 112. The luminance-based image pipeline 230 converts the captured image data into YUV data 215A and calculates luminance levels (e.g., Y levels 213A) for the YUV data 215A. For example, the luminance-based image pipeline 230 identifies a plurality of blocks (e.g., 4×4 blocks) in the YUV data 215A. For each block, the luminance-based image pipeline 230 may use a sum or average of pixel values in the block as a luminance level (Y level 213A). In this example, the luminance-based image pipeline 230 can determine a Y level for each block within the YUV data 215A. In some embodiments, a Y level is directly proportional to a brightness of a corresponding block, such that a Y level for a first block is greater than a Y level for a second block that is darker than the first block. The luminance-based image pipeline 230 stores the YUV data 215A and the Y levels 213A into the memory 104.

The encoder 220 extracts the YUV data 215B and the Y levels 213B from the memory 104. The encoder 220 selects a quantization level for each block of the YUV data 213B based on the Y level 213B corresponding to that block. For example, if the Y level 213B for a block indicates that the block is below a threshold level of brightness, the encoder 220 can select a below-threshold quantization level (e.g., a strength of quantization that is below a threshold) for the block such that the block, when compressed using the selected quantization level, is compressed in such a way as to preserve an above-threshold amount of image information within the block. If the Y level 213B for a block indicates that the block is above a threshold level of brightness, the encoder 220 can select an above-threshold quantization level (e.g., a strength of quantization that is above a threshold) for the block such that the block, when compressed using the selected quantization level, is compressed by an above-threshold compression factor. In some embodiments, if the Y level 213B for a block indicates that the block is above a threshold level of brightness, the encoder 220 can select a below-threshold quantization level for the block such that the block, when compressed using the selected quantization level, is compressed in such a way as to preserve an above-threshold amount of image information within the block. If the Y level 213B for a block indicates that the block is below a threshold level of brightness, the encoder 220 can select an above-threshold quantization level for the block such that the block, when compressed using the selected quantization level, is compressed by an above-threshold compression factor. The encoder 220 generates compressed encoded data 225 by applying different quantization levels to different blocks of the YUV data 215B based on luminance levels. The compressed encoded data 225 may include less-compressed darker image portions with above-threshold amounts of image information preserved, and more-compressed brighter portions (or vice-versa). As such, the image processing engine 116A performs the image processing based on image luminance data without significantly increasing system bandwidth or power. Additionally and/or alternatively, the encoder 220 uses Y level 213B to determine a block type (such as Intra, Inter, or skip block), a transform size, a transform type, or spacing between reference frames (such as I frames) or the GOP structure of an encoded stream (such as a series of encoded images or frames). Examples are further described in detail below with regard to FIG. 5A through FIG. 5C.

Typically, human eyes are more susceptible to notice flaws or artifacts in flat, smooth, or non-detailed areas of an image. For example, any "blocky"-type image artifacts in a portion of an image corresponding to the sky will be very noticeable. Likewise, human eyes are less susceptible to find (or care about) details of dense areas (such as the tree in a moving picture). To overcome this problem, an image can be encoded based on image activity (such as the activity variance). Image activity describes details of objects that are captured in an image. For example, flat areas such as the sky and smooth walls have less activity while dense areas such as tree leaves and water from a water fountain have high activity. Activity variance describes a difference in activity among blocks of a same image (or frame), or among blocks of different images (or frames). For example, for a single image, the activity variance of the image describes areas of the image as 'dense' or 'flat'. The 'dense' or 'flat' areas can be encoded differently such that the quality of encoding is maintained uniformly across the image. For example, more dense areas may take more bits to encode (in order to preserve more details) while less dense areas may take fewer bits to encode. Examples are further described in detail below with regard to FIG. 4A through FIG. 4C. In another example, the activity variance describes a difference in activity between corresponding portions of multiple frames. Examples are further described in detail below with regard to FIG. 5A through FIG. 5B.

Figure 3:
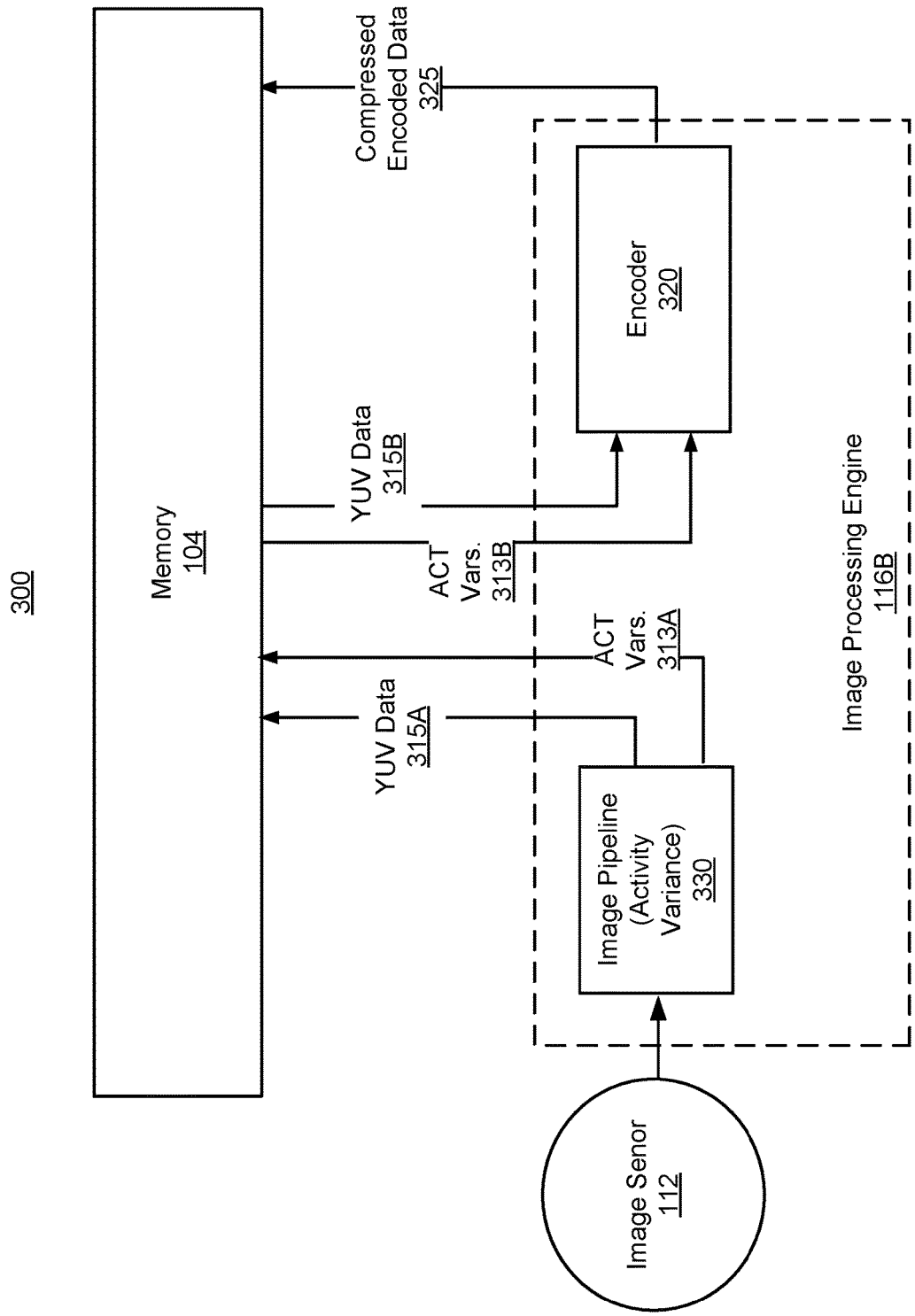
FIG. 3 illustrates an example high-level block diagram of a camera system for processing images based on image activity data, according to one embodiment.

FIG. 3 illustrates an example high-level block diagram of a camera system for processing images based on image activity data, according to one embodiment. In the embodiment of FIG. 3, the imaging processing engine 116B includes an activity-based image pipeline 330, and an encoder 320. In some embodiments, the imaging processing engine 116B can include different and/or additional components than those illustrated in the embodiment of FIG. 3 to perform the functionalities described herein.

As shown in FIG. 3, the activity-based image pipeline 330 receives the captured image data from the image sensor 112. The activity-based image pipeline 330 converts the captured image data into YUV data 315A and calculates image activity data (e.g., activity variances ACT Vars. 313A) for the YUV data 315A. For example, the activity-based image pipeline 330 identifies a plurality of blocks (e.g., 4×4 blocks) in the YUV data 315A. For each block, the activity-based image pipeline 330 may add a sum or average of differences of pixel values along a vertical direction of the YUV data 315A and a sum or average of differences of pixel values along a horizontal direction of the YUV data 315A together as an activity variance. In this example, the activity-based image pipeline 330 can determine ACT Var. 313A for each bock within the YUV data 315A. In some embodiments, an ACT var. is directly proportional to amounts of activities of a corresponding block, such that an ACT Var. for a first block is greater than an ACT Var. for a second block that has larger amounts of activities than the first block. The activity-based image pipeline 330 stores the YUV data 315A and the Y levels 313A into the memory 104.

The encoder 320 extracts the YUV data 315B and the ACT Vars. 313B from the memory 104. The encoder 320 determines a quantization level for each block of the YUV data 315B based on the ACT Vars. 313B corresponding to that block. For example, if the ACT Var. 313B for a block indicates that the block is above a threshold level of activities, the encoder 320 can select a below-threshold quantization level (e.g., a strength of quantization that is below a threshold) for the block such that the block, when compressed using the selected quantization level, is compressed in such a way as to preserve an above-threshold amount of image information within the block. If the ACT Var. 313B for a block indicates that the block is below a threshold level of activities, the encoder 320 can select an above-threshold quantization level (e.g., a strength of quantization that is above a threshold) for the block such that the block, when compressed using the selected quantization level, is compressed by an above-threshold compression factor.

In some embodiments, if the ACT Var. 313B for a block indicates that the block is below a threshold level of activity, the encoder 320 can select a below-threshold quantization level for the block such that the block, when compressed using the selected quantization level, is compressed in such a way as to preserve an above-threshold amount of image information within the block. If the ACT Var. 313B for a block indicates that the block is above a threshold level of activities, the encoder 320 can select an above-threshold quantization level for the block such that the block, when compressed using the selected quantization level, is compressed by an above-threshold compression factor. The encoder 320 generates compressed encoded data 325 by applying different quantization levels to different blocks of the YUV data 315B based on activity variances. The compressed encoded data 325 may include less-compressed higher-activity image portions with above-threshold amounts of image information preserved, and more-compressed lower-activity portions (or vice-versa). As such, the image processing engine 116A performs the image processing based on image activity data without significantly increasing system bandwidth or power. Additionally and/or alternatively, the encoder 320 uses ACT Vars. 313B to determine a block type (such as Intra, Inter or skip block), transform size of the block, or type of transform, or spacing between reference frames (such as I frames) or the GOP structure of an encoded stream (such as a series of encoded images or frames).

Figure 4A:
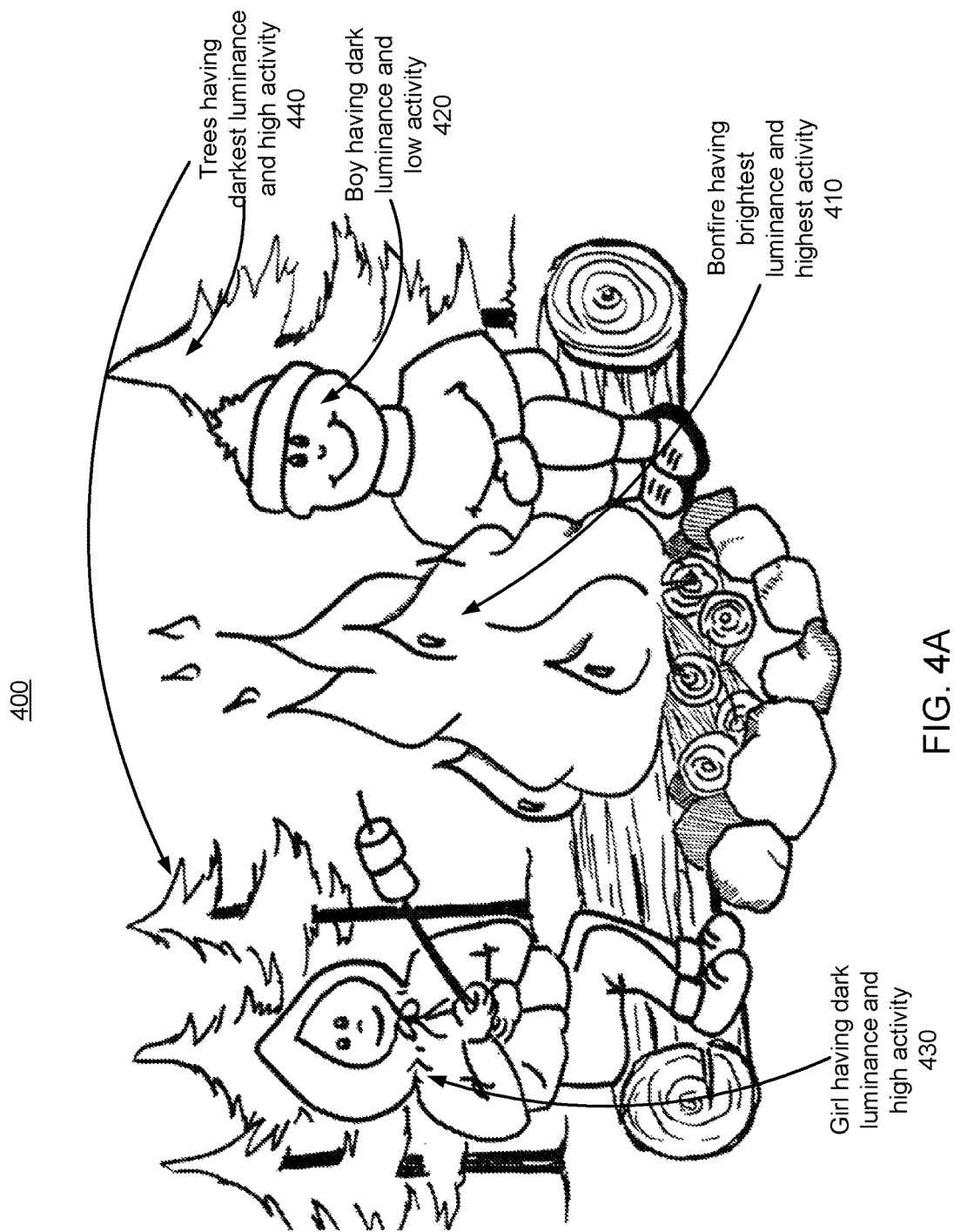
FIG. 4A illustrates an image captured by an image sensor having portions with different luminance levels and activity variances, according to one embodiment.

FIG. 4A illustrates an image 400 captured by the image sensor 112 having portions with different luminance levels and activity variances, according to one embodiment. As shown in FIG. 4A, the image 400 may be divided into four portions. Each portion may include one or more blocks. A first portion 410 includes a bonfire and has a brightest luminance and a highest activity. A second portion 420 includes a boy and has a dark luminance (e.g., less light on the face and body) and low activity (e.g., non-textured clothing and more flat areas). A third portion 430 includes a girl and has a dark luminance (e.g., less light on face and body) and high activity (e.g., details on marshmallows, textured clothing, etc.). A fourth portion 440 includes trees and has a darkest luminance and high activity (e.g., dense leaves).

Figure 4B:
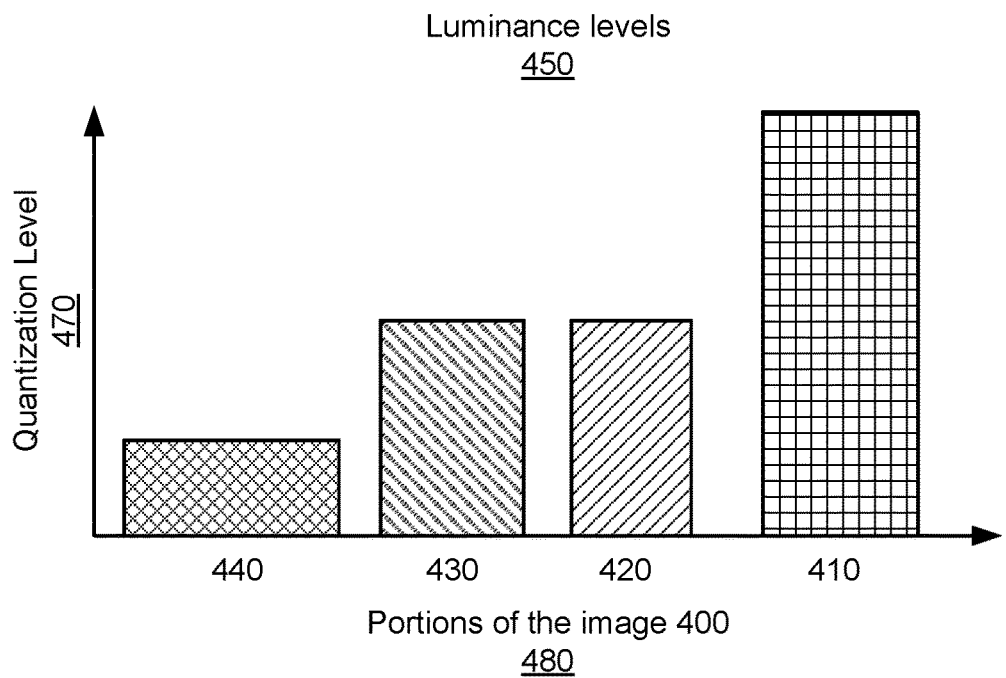
FIG. 4B illustrates a diagram showing relationships between quantization levels and the luminance levels of image portions illustrated in FIG. 4A, according to one embodiment.

FIG. 4B illustrates a diagram 450 showing relationships between quantization levels 470 and the luminance levels of image portions illustrated in FIG. 4A, according to one embodiment. The goal is to preserve image quality at low light while maintaining quality at well illuminated arears in the image. As shown in FIG. 4A, a lower quantization level is applied to the low luminance level areas and a higher quantization level is applied to high luminance areas. The relationship between luminance levels and quantization level among the portions is: the quantization level for the first portion 410 (with the highest luminance level) is greater than the quantization level for the second portion 420 and the third portion 430 (with moderate luminance levels), which are greater than the quantization level for the fourth portion 440 (with the lowest luminance level). Thus, the highest quantization level is applied to the first portion 410, the lowest quantization level is applied to the fourth portion 440, and a moderate quantization level is applied to the second portion 420 and the third portion 430.

Figure 4C:
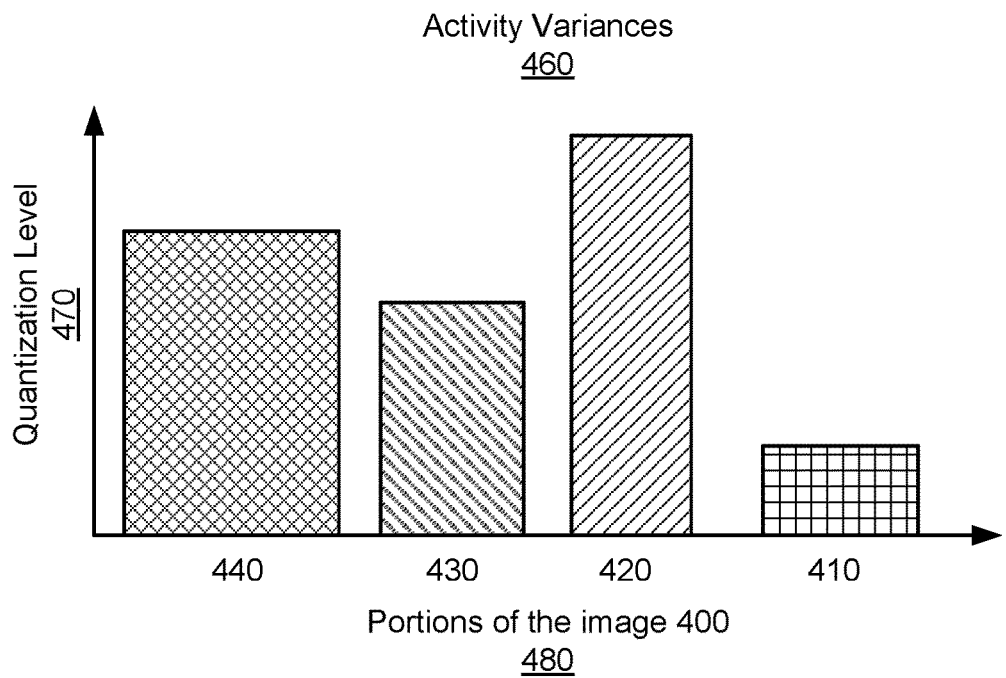
FIG. 4C illustrates a diagram showing relationships between quantization levels and the activity variances of image portions illustrated in FIG. 4A, according to one embodiment.

FIG. 4C illustrates a diagram 460 showing relationships between quantization levels 470 and the activity variances of image portions illustrated in FIG. 4A according to one embodiment. As shown in FIG. 4A, the relationship of between activity variances and quantization levels among the portions is: the quantization level for the first portion 410 (with the highest activity level) is lower than the quantization level for the third portion 430 (with the second highest activity level), which is lower than the quantization level for the fourth portion 440 (with the third highest activity level), which is lower than the quantization level for the second portion 420 (with the lowest activity).

Image activity data can be used to determine a change in scene or to select a GOP structure for a dynamic GOP. For example, a large change in activity between two neighboring frames can be used as indication of change of scene. This change of scene information can be used for dynamically inserting I frame (or reference frame) or dynamically changing the GOP structure.

Figure 5A:
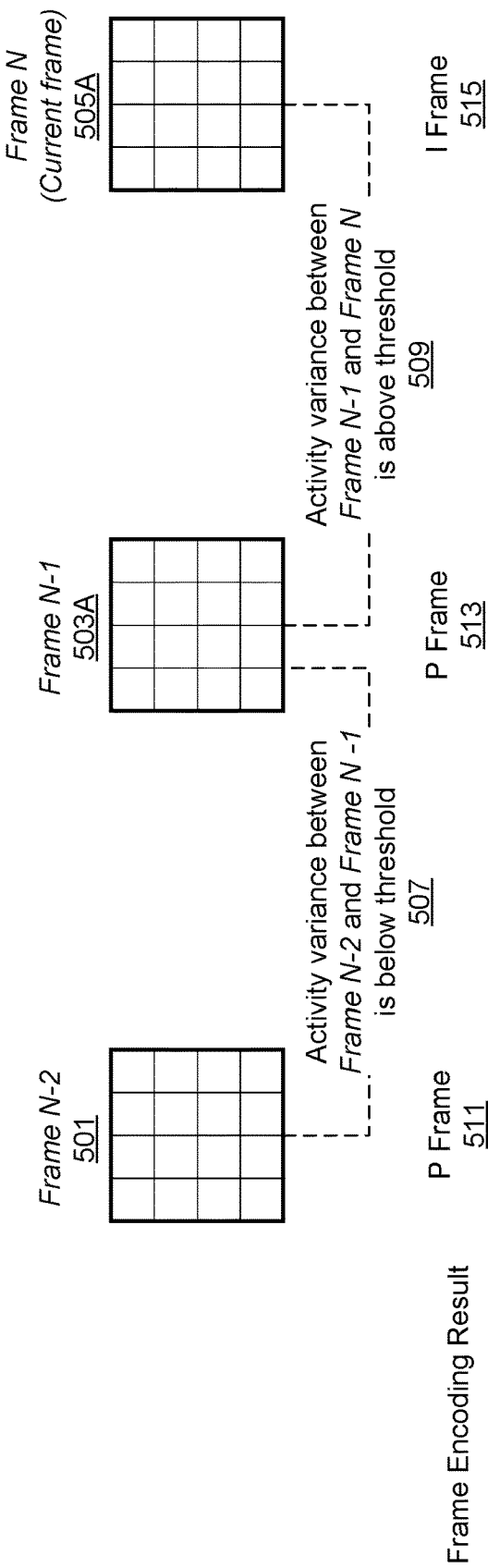
FIG. 5A illustrates a diagram of determining a reference frame of a series of frames based on image activity data, in according to one embodiment.

FIG. 5A illustrates the determination of a reference frame 511 of a series of frames based on image activity data, in according to one embodiment. A large change in scene (such as a black picture between frames scenes or the start of completely different shot) may show a large activity variance per block. For instance, in a scene where a bus moves in a park, the activity variance between frames may be smaller than in a scene where fireworks are exploding in a dark sky. The activity variance between frames can determine a scene change. In some embodiments, a histogram is calculated for activity variance between frames. For example, the activity variance between frames can be calculated as described above with regard to FIG. 3. This histogram is then compared with a histogram calculated for a previous frame to determine the activity variance between the two frames. In some embodiments, comparisons between frames may be a simple difference, or may be more complex (e.g., by comparing the amplitude and frequency of one or more factors between frames).

The activity variance between frames is compared against a threshold value. If the activity variance between frames is greater than the threshold value, a scene change can be detected. The threshold value may be pre-determined, for instance based on known encoded content. This threshold value can be tuned (or trained) based on the noise level and luminance level of the scene. As shown in FIG. 5A, a frame N-2 501 is encoded as P frame 511. Before encoding frame N-1 503A, block-based activity data of the unencoded frame N-1 503A is compared with block-based activity data of a previously encoded frame N-2 501 to calculate an activity variance between these two frames. The activity variance between the frame N-1 503A and the frame N-2 501 is determined to be below the threshold value. Accordingly, the frame N-1 503A is encoded as P frame 513. Before encoding frame N 505A, block-based activity data of the unencoded frame N 505A is compared with block-based activity data of a previously encoded frame N-1 503A to calculate an activity variance between these two frames. The activity variance between the frame N 505A and the frame N-1 503A is determined to be above the threshold value 509. Accordingly, a scene change is detected, and the frame N-1 503A is encoded as I frame 515.

In some embodiments, image activity data can be similarly applied to a GOP. For example, an activity variance between an unencoded image and an encoded image can be calculated. If the activity variance is above a predetermined threshold value, a scene change between the two images is detected. The unencoded image can then be encoded as an I image.

In some embodiments, a large activity variance between neighboring frames for the same block indicates a sudden movement of object (or camera) or appearance of new object in a scene captured in an image. For example, a ball suddenly appearing in a scene can be identified by comparing activity variance with neighboring frames. In scenarios where a new object appears in a scene for the first time, there is no previous history of the new object. Blocks associated with the new object can be marked with higher weights or higher biases for Intra blocks. While encoding, the Intra/Inter decision could take these weights/biases in consideration before classifying the block as an Intra- or Inter-type block. In other words, this algorithm can provide hints to the encoder so that the encoder can make a better block type decision.

FIG. 5B illustrates a block type determination based on image activity data, according to one embodiment. An activity variance of each block is listed in a respective block location of the frame N-1 503B and the frame N 505B. A large difference 517 in activity variance of blocks between neighboring frames (e.g., the frame N-1 503B and the frame N 505B) is determined and circled within FIG. 5B. These blocks are flagged with higher weights (or bias), and these weights/biases can be used to classify blocks as Intra- or Inter-blocks. A larger difference in activity variance among the same blocks in frames N-1 503B and N 505B is indicated by assigning a higher weight. In some embodiments, a higher weight indicates a higher probability of a block being an Inter block, whereas in other embodiments, a high weight indicates a higher probability of a block being an Intra block. In some embodiments, a smaller difference in activity variance between neighboring frames indicates a lower probability of a block being an Intra block (since block has smaller change/movement from previous frame and a history is maintained), while in other embodiments, a smaller difference in activity variances indicates a lower probability of a block being an Inter block. It should be noted that in some embodiments, the likelihood that a block is either an Intra block or an Inter block is either directly or inversely proportional to an activity variance associated with the block.

In some embodiments, an activity variance of each block can be used to determine block transform size and block prediction size. In cases where bit preservation is needed in high activity areas, smaller transform and prediction (either Intra- or Inter-block) can be used. Based on activity variance, an encoder can use the appropriate transform and prediction sizes. For example, an encoder can use activity data to select a transform and prediction block size of 4×4, 8×8, or 16×16 based on image activity data. This method can be used to assist computationally-intensive algorithms such as rate-distortion operations to reduce computations and save power in real time during encoding.

Figure 5C:
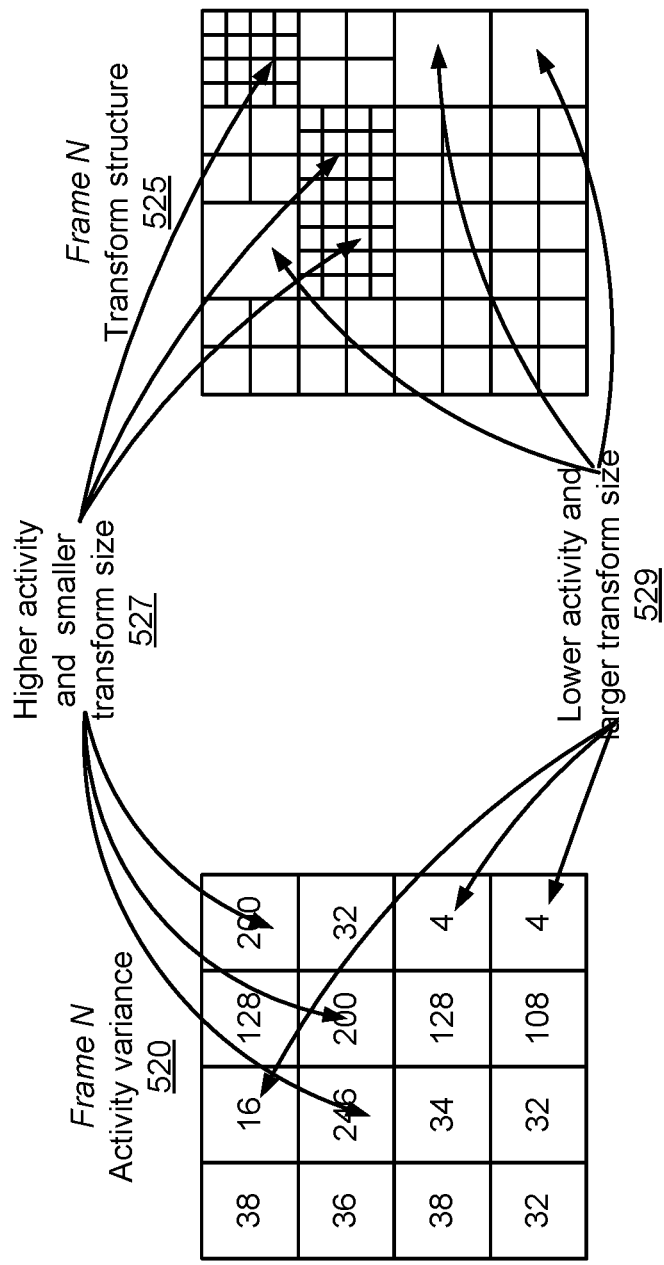
FIG. 5C illustrates a diagram of determining a transform size based on image activity data, in according to one embodiment.

FIG. 5C illustrates the determination of a transform size based on image activity data, in according to one embodiment. An activity variance of each block is listed in a respective block location of the frame N 520. The activity variance of each block is used to determine a respective transform block size for the block. As shown in FIG. 5C, a larger transform size (e.g., 16×16) can be applied to blocks with lower activity variances (such as activity values that are below or equal to 16). Likewise, a smaller transform size can be applied to blocks with higher activity variances (such as activity variances that are above or equal to 200).

In some embodiments, a similar method based on image activity data can be applied to prediction size. For example, a larger prediction size can be applied to blocks with lower activity variances, while a smaller prediction size can be applied to blocks with higher activity variances.

In some embodiments, the reference frame or picture (e.g., I frame or I picture) can be determined based on image luminance data. For example, a luminance level of each block is calculated. If a difference in luminance level between an encoded frame and an unencoded frame is above a predetermined threshold, a scene change is determined, and the unencoded frame can be encoded as I frame. This can be in addition to activity variance based scene change detection to avoid any false results.

Figure 6:
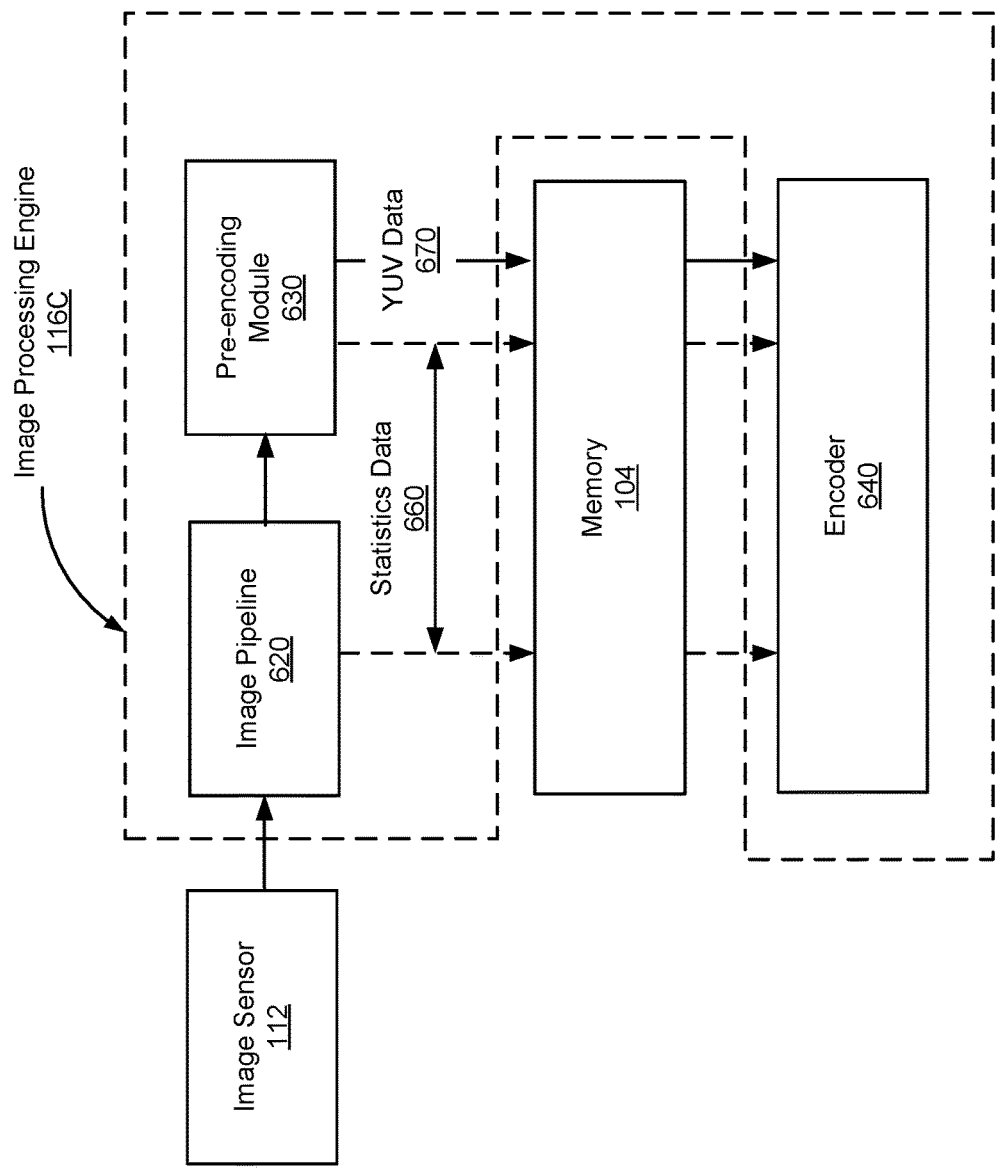
FIG. 6 illustrates an example block diagram of an image processing engine, according to one embodiment.

FIG. 6 illustrates an example high-level block diagram of an image processing engine 116C, according to one embodiment. In the embodiment of FIG. 6, the image processing engine 116C includes an image pipeline 620, a pre-encoding module 630, and an encoder 640. The statistics data 660 includes image luminance data and image activity data. Both or either of the image pipeline 620 and the pre-encoding module 630 can generate the statistics data 660 and store the statistics data 660 into the memory 104. The pre-encoding module 630 generates the YUV data 670 and stores the YUV data 670 into the memory 104. The encoder 640 extracts the statistics data 660 and the YUV data 670 from the memory 104, analyzes the data, and generates compressed encoded data based on the data 660 and the YUV data 670. Data reduction operations can be performed before storing data in the memory 104 (for instance, each range of luminance levels or activity data can be put in buckets to limit the total number of levels and activity variances). In some embodiments, the encoder 640 determines a quantization level based on both a luminance level and an activity variance of each block in the YUV data. It should be noted that although embodiments described herein include the use of a memory to store data 660 prior to encoding by the encoder 640, in other embodiments, the encoder 640 receives the statistics data directly from the image pipeline 620 and pre-encoding module 630 without the statistics data first being stored in the memory.

In one embodiment, the encoder 640 determines a quantization level for each block based on both a corresponding luminance level and a corresponding activity variance. For example, the encoder 640 determines a quantization level for a block based on a luminance level of the block, and then adjusts the determined quantization level based on an activity variance of the block such that the adjusted quantization level is able to compress the block at an above-threshold level of compression while preserving an above-threshold amount of image information, for instance to preserve image information in portions of the image with both high activity levels and low luminance levels. Similarly, the encoder 640 can determine a quantization level for a block based on an activity variance of the block first, and then can adjust the determined quantization level based on a luminance level of the block. In some embodiments, the encoder 640 weights quantization levels based on a luminance level and an activity variance of a block. In such embodiments, if the luminance level is much greater than the activity variance, the encoder 640 weights the quantization level based more on the luminance level, and vice versa.

Encoding Image Data Based on Image Luminance Data

FIG. 7 illustrates a process 700 for encoding image data based on image luminance data, according to one embodiment. In some embodiments, the process 700 is performed by the camera system 100. In some embodiments, the method includes different, additional, or fewer steps than those depicted by FIG. 7, and the steps described in conjunction with FIG. 7 can be performed in different orders.

The camera system 100 converts 710 light incident upon an image sensor into raw image data. For example, the image sensor 112 converts light incident upon an image sensor into raw RGB image data. The camera system 100 then converts 720 raw image data into color-space image data. For example, the image processing engine 116 coverts the raw RGB image data into YUV data.

The camera system 100 calculates 730 luminance levels of the color-space image data. For example, the image processing engine 116 identifies a plurality of blocks in the YUV data and calculates a luminance level for each block. The image processing engine 116 may determine a luminance level for a block by using a sum of pixel values in the block.

The camera system 100 stores 740 the color-space image data and the luminance levels into the memory 104. The camera system 100 extracts 750 the color-space image data and the luminance levels from the memory 104. It should be noted that in some embodiments, the storage 740 of color-space image data into memory and the extraction 750 of the color-space image data from memory are bypassed.

The camera system 100 encodes 760 the color-space image data based on the luminance levels. For example, the camera 100 determines a quantization level for each block based on a luminance level corresponding to the block. If a luminance level for a block indicates that the block is darker, the camera system 100 can select a lower quantization level (e.g., a quantization level with less quantization strength) than for a block corresponding to a brighter luminance level. The encoded image data can then be stored in memory, can be processed using one or more processing operations, or can be outputted to a display, for instance, for preview by a user of the camera.

Encoding Image Data Based on Image Activity Data

Figure 8:
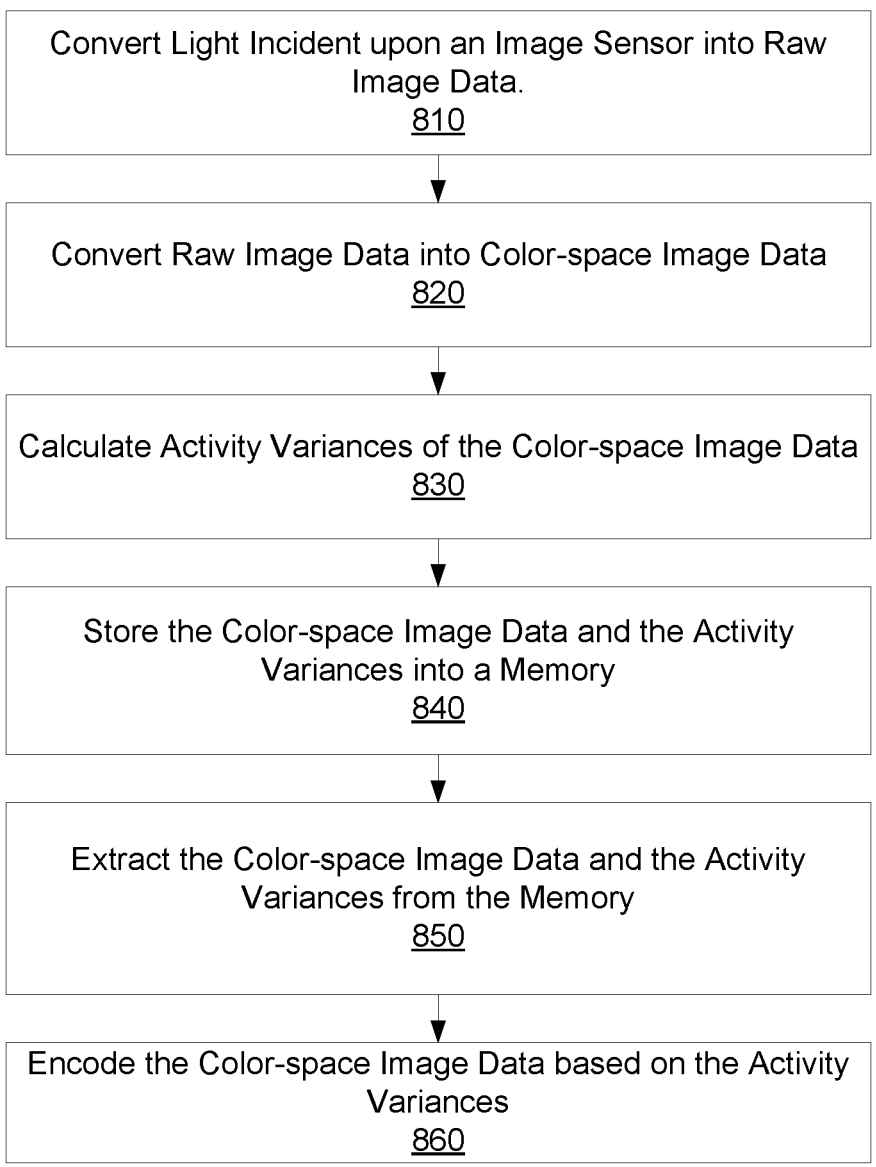
FIG. 8 illustrates a process for encoding image data based on image activity data, according to one embodiment.

FIG. 8 illustrates a process 800 for encoding image data based on image activity data, according to one embodiment. In some embodiments, the process 800 is performed by the camera system 100. In some embodiments, the method includes different, additional, or fewer steps than those depicted by FIG. 8, and the steps described in conjunction with FIG. 8 can be performed in different orders.

The camera system 100 converts 810 light incident upon an image sensor into raw image data. For example, the image sensor 112 converts light incident upon an image sensor into raw RGB image data. The camera system 100 then converts 820 raw image data into color-space image data. For example, the image processing engine 116 coverts the raw RGB image data into YUV data.

The camera system 100 calculates 830 activity variances of the color-space image data. For example, the image processing engine 116 identifies a plurality of blocks in the YUV data and calculates an activity variance for each block. The image processing engine 116 may determine an activity variance for a block by adding a sum of differences of pixel values along a vertical direction of the YUV data and a sum of differences of pixel values along a horizontal direction of the YUV data in the block.

The camera system 100 stores 840 the color-space image data and the activity variances into the memory 104. The camera system 100 extracts 850 the color-space image data and the activity variances from the memory 104. It should be noted that in some embodiments, the storage 840 of color-space image data into memory and the extraction 850 of the color-space image data from memory are bypassed.

The camera system 100 encodes 860 the color-space image data based on the activity variances. For example, the camera system 100 determines a quantization level for each block based on an activity variance corresponding to the block. If an activity variance for a block indicates that the block has a higher activity level, the camera system 100 can select a lower quantization level than for a block corresponding to a lower activity level. The encoded image data can then be stored in memory, can be processed using one or more processing operations, or can be outputted to a display, for instance, for preview by a user of the camera.

Additional Configuration Considerations

Certain embodiments are described herein as including logic or a number of components, modules, or mechanisms, for example, as illustrated in FIGS. 2 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives.

For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for synchronizing multiple image sensors through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A camera system, comprising:
    an image sensor configured to convert light incident upon the image sensor into raw image data;
    an image pipeline configured to:
    convert the raw image data into color-space image data; and
    calculate activity variances of the color-space image data;
    an encoder configured to:
    determine quantization levels of the color-space image data based on the activity variances; and
    encode the color-space image data using the determined quantization levels to produce encoded image data; and
    a memory configured to store the encoded image data.

2. The camera system of claim 1, wherein calculating activity variances of the color-space image data comprises:
    identifying a plurality of blocks of the color-space image data; and
    calculating an activity variance of each block.

3. The camera system of claim 2, wherein calculating the activity variance of each block comprises:
    adding a sum of differences of pixel values along a vertical direction of the color-space image data and a sum of differences of pixel values along a horizontal direction of the color-space image data together.

4. The camera system of claim 2, wherein determining quantization levels of the color-space image data based on the activity variances comprises:
    determining a quantization level for each block based on a corresponding activity variance of the block.

5. The camera system of claim 4, wherein a greater quantization level is determined for a first block than for a second block having higher activity level than the first block.

6. The camera system of claim 1, wherein the image pipeline is further configured to calculate luminance levels of the color-space image data, wherein the encoder is further configured to determine quantization levels of the color-space image data based on the luminance levels and to encode the color-space image data using the determined quantization levels; and wherein the memory is further configured to store the color-space image data and the luminance levels.

7. The camera system of claim 6, wherein at least one quantization level is determined based on both a luminance level and an activity variance.

8. The camera system of claim 1, wherein the image pipeline is further configured to store the color-space image data and activity variances into the memory, and the encoder is further configured to extract the color-space image data and activity variances from the memory.

9. The camera system of claim 1, wherein the encoder is further configured to determine a reference frame, a block type, a transform size, or a prediction size of the color-space image data based on the activity variances.

10. The camera system of claim 1, further comprising a pre-encoding module configured to pre-process the encoded image data using one or more pre-processing operations.

11. A method, comprising:
    capturing, by a camera, light incident upon an image sensor to produce raw image data;
    converting, by the camera, the raw image data into color-space image data;
    calculating, by the camera, activity variances of the color-space image data;
    determining, by the camera, quantization levels of the color-space image data based on the activity variances; and
    encoding the color-space image data using the determined quantization levels to produce encoded image data.

12. The method of claim 11, wherein calculating activity variances of the color-space image data comprises:
    identifying a plurality of blocks of the color-space image data; and
    calculating an activity variance of each block.

13. The method of claim 12, wherein calculating the activity variance of each block comprises:
    adding a sum of differences of pixel values along a vertical direction of the color-space image data and a sum of differences of pixel values along a horizontal direction of the color-space image data together.

14. The method of claim 12, wherein determining quantization levels of the color-space image data based on the activity variances comprises:
    determining a quantization level for each block based on a corresponding activity variance of the block.

15. The method of claim 14, wherein a greater quantization level is determined for a first block than for a second block having higher activity level than the first block.

16. The method of claim 11, further comprising:
    calculating luminance levels of the color-space image data;
    determining quantization levels of the color-space image data based on the luminance levels;
    encoding the color-space image data using the determined quantization levels; and
    storing the color-space image data and the luminance levels.

17. The method of claim 16, wherein at least one quantization level is determined based on both a luminance level and an activity variance.

18. The method of claim 11, further comprising storing the color-space image data and activity variances into a memory, wherein the color-space image data and activity variance are extracted from the memory before determining the quantization levels.

19. The method of claim 11, further comprising determining a reference frame, a block type, a transform size, or a prediction size of the color-space image data based on the activity variances.

20. The method of claim 11, further comprising pre-processing the encoded image data using one or more pre-processing operations.

* * * * *